(12) United States Patent
Corbett

(10) Patent No.: US 6,253,087 B1
(45) Date of Patent: Jun. 26, 2001

(54) METHOD AND SYSTEM FOR IMPROVED TRAFFIC MANAGEMENT IN WIRELESS TELECOMMUNICATION SYSTEMS

(75) Inventor: Eddie Corbett, Stockholm (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/163,299

(22) Filed: Sep. 30, 1998

(51) Int. Cl.$^7$ ........................................................ H04Q 7/20
(52) U.S. Cl. ........................ 455/450; 455/422; 455/432; 455/435; 455/445; 455/453
(58) Field of Search ................................ 455/453, 432, 455/436, 439, 445, 455, 422, 435, 438, 443, 444, 446, 447, 452; 370/331, 332, 343, 344

(56) References Cited

U.S. PATENT DOCUMENTS

| | | | |
|---|---|---|---|
| 4,670,899 | * 6/1987 | Brody et al. | 455/453 |
| 5,437,054 | * 7/1995 | Rappaport et al. | 455/447 |
| 5,649,293 | * 7/1997 | Reed | 455/453 |
| 5,666,356 | 9/1997 | Fleming et al. | 370/328 |
| 5,697,055 | * 12/1997 | Gilhousen et al. | 455/436 |
| 5,809,423 | * 9/1998 | Benveniste | 455/452 |
| 5,839,074 | * 11/1998 | Plehn | 455/450 |
| 5,852,778 | * 12/1998 | Labedz | 455/423 |
| 5,898,681 | * 4/1999 | Dutta | 370/229 |

FOREIGN PATENT DOCUMENTS

| 781066 | 6/1997 | (EP) . |
|---|---|---|
| WO97/14260 | 4/1997 | (WO) . |

OTHER PUBLICATIONS

European Search Report re RS 101812 Date of mailing of search: Mar. 26, 1999.

* cited by examiner

Primary Examiner—Daniel Hunter
Assistant Examiner—Yemane Woldetatios
(74) Attorney, Agent, or Firm—Burns, Doane, Swecker & Mathis, L.L.P.

(57) ABSTRACT

A technique is disclosed for traffic management in spread spectrum wireless telecommunications systems using different admission control levels different frequency layers. In an embodiment of the invention, the capacity on a first frequency, having a specific admission control level, is permitted to increase to the point where the development of coverage holes occurs due to the effects of cell breathing are present. This is compensated for by maintaining a designated frequency that is free from coverage problems by applying a stricter admission control relative to the first frequency. Thus calls or new access attempts affected by coverage problems on the first frequency are diverted to the designated frequency. The method improves overall network capacity and call quality in the network by more efficiently utilizing spectral resources.

9 Claims, 3 Drawing Sheets

METHOD AND SYSTEM FOR IMPROVED TRAFFIC MANAGEMENT IN WIRELESS TELECOMMUNICATION SYSTEMS

FIELD OF THE INVENTION

The present invention relates generally to wireless telecommunication networks. More specifically, the invention relates to a technique for traffic management in spread spectrum systems.

BACKGROUND OF THE INVENTION

In wireless telecommunication networks, service providers are intensely interested in providing high quality, reliable services for their customers in today's high competitive marketplace. A significant aspect affecting the service quality is the consistency of radio coverage within cell coverage areas of the network. Moreover, an additional aim from the provider's perspective is to be able to increase capacity while maintaining quality and reliability. As known by those skilled in the art, telecommunication networks operating in accordance with code division multiple access (CDMA), which are also referred to as spread spectrum systems, the cell coverage is particularly affected by the traffic load in the cell. For example, as more traffic is carried by the cell, its coverage area tends to contract, on the other hand as less traffic is present, the coverage area of the cell tends to expand.

The tendency for cells to shrink and expand in relation to number of users in the cell is known in the art as "cell breathing" and occurs, for example, since each user in a CDMA system cumulatively contributes to the interference in the cell since they simultaneously share a common frequency band. It should be noted that there are typically multiple frequency layers upon which the users may operate on. The multiple layers permit service providers to add capacity while conforming to predefined frequency bands specified by the operating standard. The inherent nature of spread spectrum systems permits all users to transmit and receive on the same frequency thus each of the transmissions necessarily "interfere" with each other. As more traffic appears in the cell, the more interference is introduced thereby increasing the power threshold that a mobile must transmit to overcome the interference in order to sufficiently communicate with the base station. This effect tends to be more prominent on uplink transmissions from mobiles since their power levels tend to be more limited in comparison to that of the base station.

An undesirable consequence of cell breathing is the development of coverage holes (or gaps) that may occur between cells during periods of high traffic load. Consequently, a mobile straying into a coverage hole may not have a sufficient connection to continue the call, thus the call may be dropped. In the context of the present invention, the term "call" is used interchangeably to include either voice or data traffic. The extent to which coverage holes develop in generally related to the cell planning performed by the service provider. By way of example, the provider typically uses cell planning tools, network measurements, field and drive tests among other things in order to determine a suitable base station deployment for sufficient network coverage. Thus, one known way of minimizing the undesirable occurrence of holes is to simply increase the number of base stations for a given network coverage area. Increasing the density of base stations permits sufficient coverage overlap in order to compensate for cell contraction due to cell breathing. However, a major disadvantage of adding more base stations is that it is an extremely expensive solution to implement in order to counter the effects of cell breathing.

Another technique that has been used in the prior art for reducing the likelihood of coverage holes is to carefully limit the amount of interference in the cell before it reaches precarious levels. Typically this is performed by admission control whereby a strict limit for traffic capacity is imposed within the cell. A theoretical load limit for ideal conditions may be calculated which thereby represents the capacity on the cell at 100% load. However, the practical load limit, which is the capacity level at which the development of coverage problems become unacceptable, is determined by using various theoretical and experimental methods including cell planning tools, network measurements, and field and drive tests. For example, a practical load limit of 65% on the cell may be found to be the point at which coverage holes start to become unacceptable. This may be reflected in a dropped call rate that is approaches unacceptable levels. Therefore, in most cases admission control algorithms are programmed to maintain the capacity levels of cells to stay within the practical load limit. It should be noted that the admission control level can be represented in other ways such as a specific number of users in a cell, for example.

The specific load limit levels may vary from network to network depending on the particular network configuration, for example, number of base stations, traffic volume, type of traffic i.e. voice or data etc. Hence a network operating with a strict form of admissions control may at times, and perhaps unnecessarily, limit the capacity in cells below a higher level that it may otherwise be able to handle, thereby depriving service providers of additional revenue. In view of the foregoing, it would be desirable to implement an improved traffic management technique that minimizes the development of coverage problems without unnecessarily limiting the overall network capacity.

SUMMARY OF THE INVENTION

Briefly described, and in accordance with an embodiment thereof, the invention discloses a technique for improved traffic management in a spread spectrum wireless telecommunication network using admission control. In an embodiment of the invention, a first admission control limit is set for the first frequency based on an acceptable tolerance level for which coverage holes associated with cell breathing may develop. A second admission control limit that is stricter i.e. lower than the first admission control limit is set for a designated frequency. The second admission control limit is set low enough that it is virtually free of coverage problems. As coverage problems develop on the first frequency, mobiles on the first frequency that stray into a coverage hole are diverted to the designated frequency via a hard handoff. Moreover, access attempts made from within a coverage hole on the first frequency are likewise diverted the designated frequency.

In a second aspect of the invention, if the load on the designated frequency exceeds its admission control limit due to a large number of diverted calls, for example, the first frequency loading is checked to determine if it has room to handoff back from the designated frequency. This enables the designated frequency to remain under its admission control limit thus maintaining its ability to continue to receive diverted calls while assuring that there are no coverage problems.

The invention provides improved call traffic management within the wireless network by diverting traffic afflicted by coverage problems on one frequency to an alternative (designated) frequency that is free of such problems. The method thereby improves overall capacity and call quality in the network by utilizing frequency resources in a more efficient manner. These and other advantages of the present invention will become apparent upon reading the following detailed description and studying the various figures of the drawings.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PREFERRED EMBODIMENTS

Figure 1:
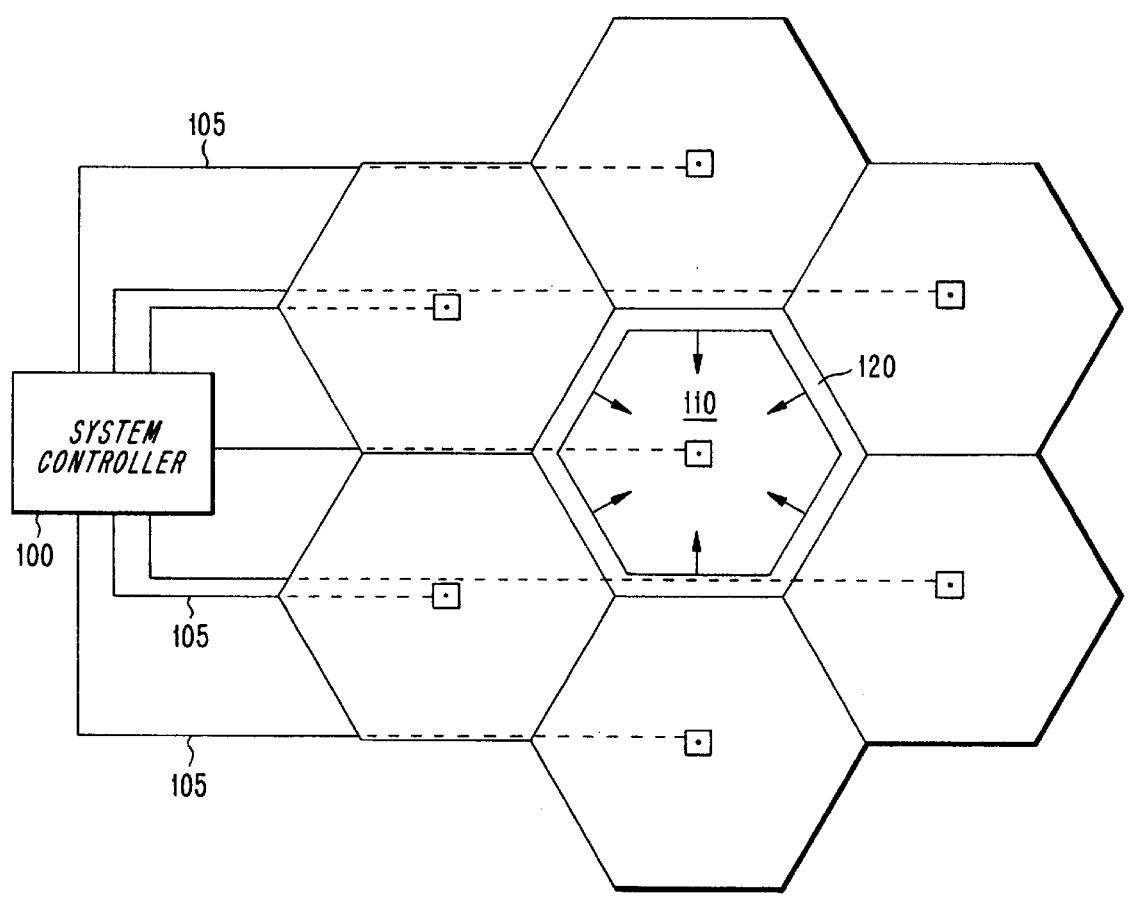
FIG. 1 illustrates the effect of cell breathing on a network.

In an exemplary cellular telecommunications network, as illustrated in FIG. 1, a system controller 100 is linked to a network of base stations by a series of digital transmission links 105. The base stations are geographically distributed to form contiguous area of radio coverage for the network. Each base station is designated to cover a specified area, known as a cell, in which two way radio communication can take place between a mobile and the base station in the associated cell. Ideally, there should be no gaps in radio coverage between cells such that seamless coverage throughout the network is achieved.

FIG. 1 conceptually illustrates the effect of cell breathing on a selected frequency for a specific cell 110 due to interference from increased traffic load. At some point the traffic load on cell 110 exceeds the practical load limit at which point the cell boundaries contract leaving a coverage gap or coverage hole 120 on that specific frequency. As a mobile, having an established connection, in cell 110 strays into coverage hole 120, there is a risk that the call may be dropped due to its inability to maintain the connection with the base station. Cell breathing effects are typically more pronounced on the uplink since, for example, the transmission power of base stations is typically much greater relative to the transmission power of the mobiles. Thus when a mobile strays into a coverage hole, there is a good likelihood that the mobile can hear the downlink transmission but its reply cannot be heard by the base station. Consequently, the mobile is often able to receive information transmitted from the base station even when in some coverage holes.

The operating frequencies for the channel bandwidths are predetermined in accordance with the operating standard e.g. 1.25 MHz frequency bands for IS-95 Network providers, who have licensed large blocks of frequencies, typically allocate more space by layering additional frequencies in concert with capacity growth. As the practical load limit is exceeded on one frequency thereby causing a contraction in coverage, full coverage will remain intact in the cell on the other operating frequencies.

In accordance with the present invention, at least one carrier frequency, which is available to all base stations throughout the system, is designated to be less heavily loaded than the other frequencies. This is carried out by applying stricter admission control to the designated frequency as compared to the others. Typically, admission control is an adjustable parameter that can be set by the network provider on a frequency-by-frequency and/or cell-by-cell basis. In general, an algorithm for admission control prevents new users from accessing or setting up calls on the particular frequency that has exceeded its predetermined admission control limit. Determining what the load limit should be is of particular importance and is typically determined by conventional means, which may incorporate the use of cell planning tools, network measurements, and field and drive tests. This may result in different values for different networks depending on the network configuration, traffic patterns as well as local terrain and RF conditions.

The load limit can be expressed as a percentage of loading capacity on the cell before breathing effects become significant. By way of example, it may be determined from prior methods that a typical admission control level of 50% load for a frequency yields an reliable level of performance wherein virtually no cell breathing effects are present. This may be quantifiably measured by monitoring a parameter indicative of the performance such as the dropped call rate, in which e.g. a range of about 1% is typically acceptable. As capacity in a cell increases, it may be determined by prior methods or by experimentation that a dropped call rate of, for example, 2% is tolerable to the provider which may correspond to an admission control level of 65%. Beyond 65% the development of coverage holes due to cell breathing, and thus the corresponding dropped call rates, are deemed not acceptable.

In an exemplary embodiment of the present invention, an admission control limit on a "normal" operating frequency $f_l$ is set to 65% and a designated frequency $f_d$ has a stricter admission control limit of 50%. For simplicity of illustration, the embodiment depicts the use of only two frequency layers. In practical applications many more frequency layers are used i.e. frequency $f_n$ is substituted for frequency $f_l$. The stricter admission control on the designated frequency $f_d$ provides reasonable assurance that the it will be substantially free of coverage problems due to cell breathing. Thus frequency $f_d$ is regarded to be a "safe" frequency for both new accesses and ongoing calls when other frequencies are experiencing coverage problems. It should be noted that the particular limits used in the present embodiment may be different for other networks and configurations. Thus they can be modified in accordance with cell planning tools or experimentation to better suit a particular network. Typically in the past, network providers simply used the same admission control of e.g. 50% for all cells. This insured that all cells were substantially free of coverage holes but at the expense of capacity.

In one aspect of the invention, when conditions on frequency $f_l$ have exceeded the predetermined admission control limit, any new access attempt to frequency $f_l$ will also be diverted to frequency $f_d$ where coverage problems do not exist. By way of example, consider a mobile about to originate a call or make a page response access in a 'coverage hole' caused by cell breathing on frequency $f_l$, it is may be the case where the mobile can hear base station transmissions but cannot raise enough power to be heard by the base station. In the case of initial access, a coverage hole refers to an area of very weak coverage that is insufficient to setup and maintain a call but the base station is still able to determine that the mobile is attempting an access. In this case the base station can transmit the appropriate information to instruct the mobile to attempt access to frequency $f_d$ instead.

Figure 2A:
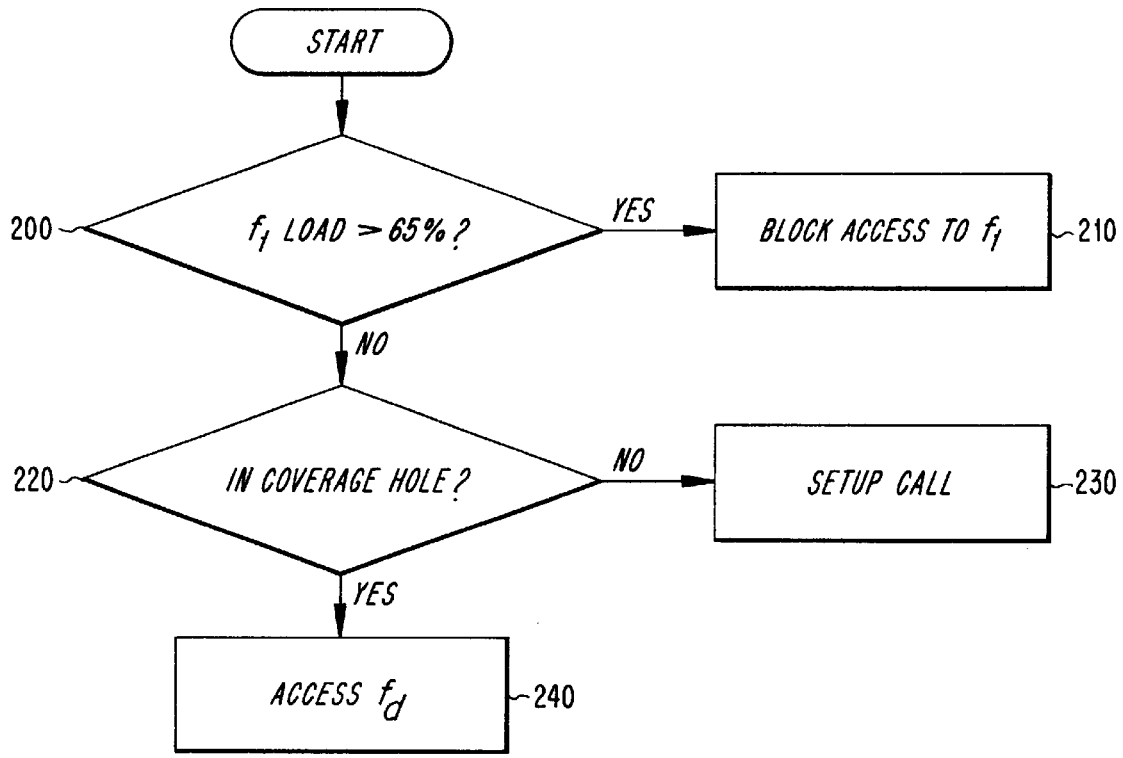
FIG. 2a shows a flow process in accordance with an embodiment of the present invention for new access attempts on frequency $f_l$.

FIG. 2a shows a flow process for new accesses to frequency $f_l$ having an exemplary admission control of 65%. At step 200, a check is performed to determine if the load level on frequency $f_l$ is greater than the 65% admission control limit. If the so, then all accesses to frequency $f_l$ are blocked, as shown in step 210. If the load is below the limit, a check is performed to determine if the mobile is in a coverage hole, as shown in step 220. If it is not in a coverage hole, then the call setup procedure is allowed to proceed (step 230). If it is determined that the mobile is in a coverage hole, then the mobile is directed to access frequency $f_d$, as shown in step 240.

Figure 2B:
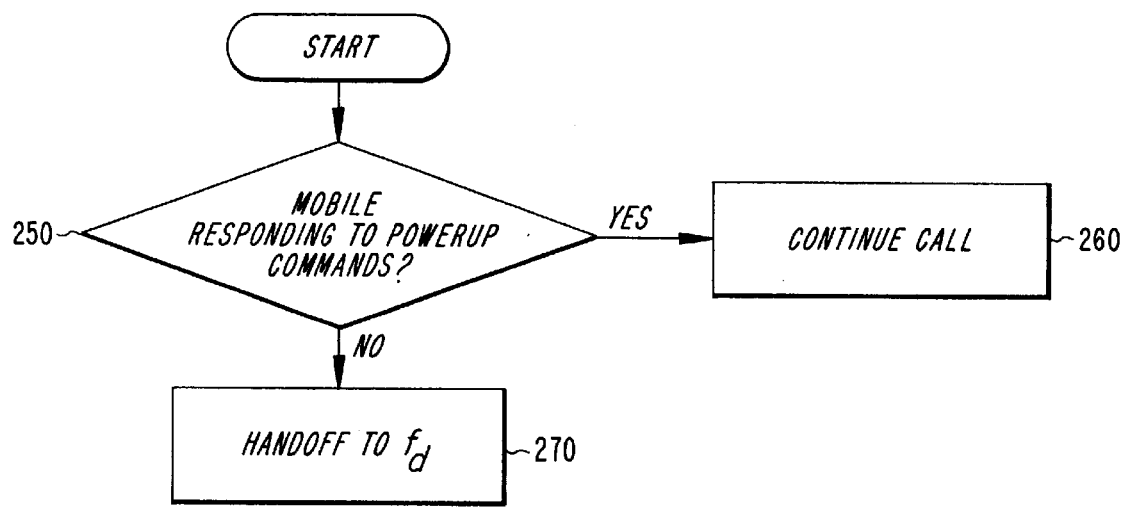
FIG. 2b shows a flow process for calls in progress on frequency $f_l$.

FIG. 2b shows a flow process for calls in progress on frequency $f_l$. In step 250, a check is performed to determine if the mobile strays into a coverage hole by, for example, detecting if the mobile is failing to respond to power up commands or has poor signal quality. The signal quality of the mobile on the cell boundary or edge of a coverage hole is typically very weak and if the mobile is transmitting at maximum power, the signal quality does not improve, as the mobile cannot respond to power up commands. Moreover, when the mobile is in a coverage hole, there will be no response from the mobile that is detectable. If the mobile does respond to power up commands, then the call is allowed to continue, as indicated in step 260. If not, then the communication link is considered insufficient and thus the call is diverted to frequency $f_d$ by via a hard handoff, as shown in step 270. The handoff between frequencies typically performed by way of a hard handoff. Hard handoffs generally carry some risk of a dropping the call since the communication link on the first frequency is terminated before link is established on the second frequency. However, the risk is considered acceptable when considering the potential complications posed by the effects of cell breathing on the original frequency.

Figure 3:
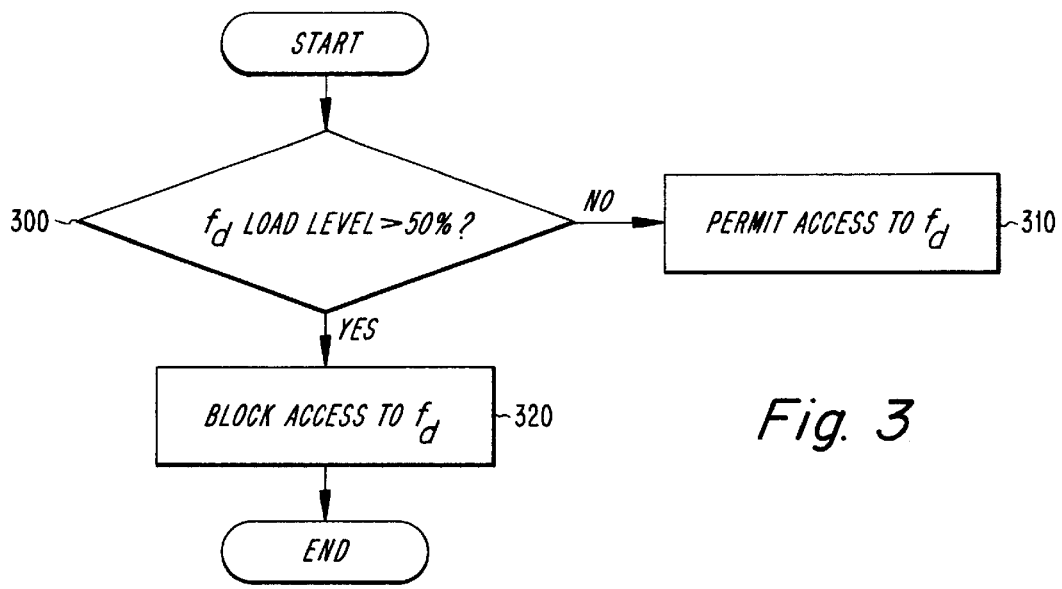
FIG. 3 shows a functional flow process in accordance with the embodiment for frequency $f_d$.

FIG. 3 shows a functional flow process for designated frequency $f_d$ having a stricter admission control of 50%. In step 300, the load level on frequency $f_d$ is checked to determine if it is greater than the admission control limit of 50%. If not, access is permitted to frequency $f_d$, as shown in step 310. If the admission control limit is exceeded, all access to frequency $f_d$ is blocked (step 320). The strict admission control on frequency $f_d$ virtually assures that there are no coverage problems induced by cell breathing on this layer and thus may be regarded as a reliable frequency in which to redirect problematic calls. However, as calls are diverted to frequency $f_d$ it may start to approach its admission control limit of 50%. It is important that the loading level is kept below this limit in order to continue accept diverted calls.

Figure 4:
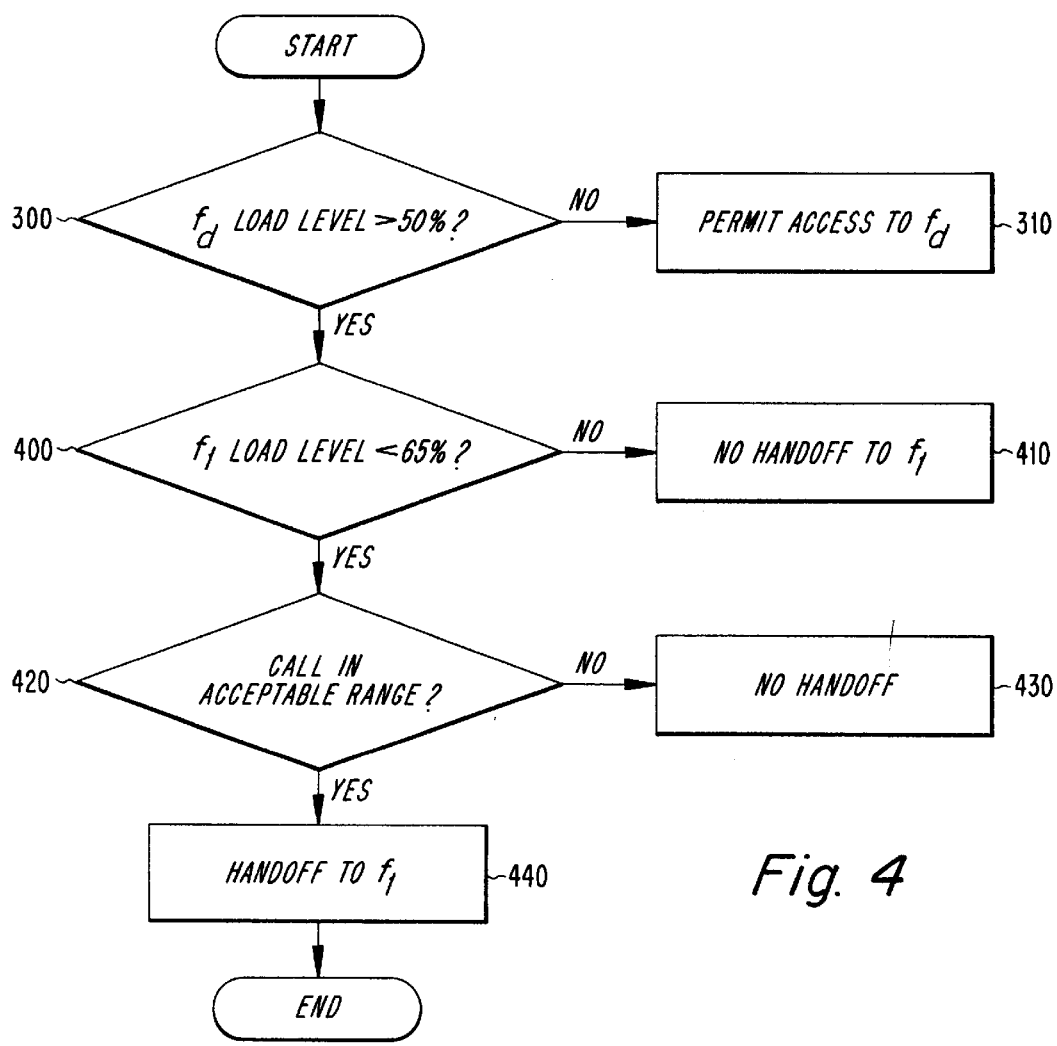
FIG. 4 illustrates an alternative flow process for frequency $f_d$.

FIG. 4 illustrates the flow process for designated frequency $f_d$ as it approaches its loading limit. A check is performed to determine if the load is above the admission control limit, as shown in step 300. If not, then access is permitted to frequency $f_d$, as shown in step 310. If the load is greater than 50%, then the current load level is checked on frequency $f_l$ (step 400) to see if it has fallen below its admission control load limit of 65%. This would indicate that there is possible room on frequency $f_l$ for a potential handoff back. If there is no room on frequency $f_l$ then no handoff occurs, as shown in step 410. If there is room on frequency $f_l$ then a check to determine if a call is relatively close to the base station (step 420) by, for example, checking the path loss (signal strength) of the transmitted signal or another indicative parameter. This check is performed to make sure that calls near the edge of coverage on frequency $f_d$ do not become candidates for handoff back to frequency $f_l$, since the signal strength will be relatively weak there as well after the handoff. Other good candidates for handoff are stationary calls which may be detected by using geo-location means such as global positioning satellites (GPS), for example. If the call is not within an acceptable range then no handoff is performed (step 430). If the call is within an acceptable range i.e. strong signal strength, then a hard handoff back to frequency $f_l$ is performed, as shown in step 440. This handoff back procedure maintains the 'safety' margin for frequency $f_d$ such that it remains prepared to accept calls that need to be diverted. It should be noted that in applications having more than two frequency layers, in step 400, it may scan other all other frequencies for a suitable frequency to handoff to.

The present invention contemplates the use of different admission control levels on different frequency layers in order to more efficiently manage network traffic in a wireless telecommunication system. Furthermore, the method diverts problematic calls to a designated frequency in order to avert the effects of cell breathing. The invention provides improved call distribution within the network thereby permitting an increase in capacity without undue affects from developing coverage problems.

While the invention has been described with reference to a specific embodiment, the description is illustrative of the inventive concept and is not to be construed as limiting to the invention. In particular, the inventive concept is applicable to a network having a substantial plurality of frequency layers. Various modifications and steps may occur to those skilled in the art without departing from the true spirit and scope of the invention as defined by the appended claims.

What is claimed is:

1. In a wireless telecommunication system comprising a network of base stations geographically distributed to provide radio coverage by forming a plurality of individual cells, wherein users of said system make and receive calls on a plurality of frequencies layers within said system, a method of managing call traffic comprising the steps of:

setting a first admission control limit on a first frequency;

setting a second admission control limit on a second frequency, wherein the second admission control limit is less than the first admission control limit; and diverting a call from the first frequency to the second frequency in response to coverage problems occurring in the first frequency affecting the call, wherein the first and second frequencies are utilized within an individual cell.

2. A method according to claim 1 wherein said first admission control limit is set at a level corresponding with a dropped call rate approximately in the range of 1.5% to 2% resulting from coverage holes.

3. A method according to claim 1 wherein said second admission control limit is set to a substantially lower level than the first admission control limit such that there are virtually no coverage problems on the second frequency.

4. A method according to claim 2 wherein said diverting step occurs via a hard handoff when a call in progress on the first frequency encounters said coverage problems.

5. A method according to claim 2 wherein said diverting step includes diverting an access attempt made from a coverage hole on the first frequency.

6. A method according to claim 1 wherein said diverting step further comprises the steps of:

checking the load on the first frequency;

checking the signal strength of a call on the second frequency for determining if it is an adequate candidate for handoff; and handing off the call to the first frequency when the load on the first frequency is below the first admission control limit.

7. A system for distributing call traffic within a wireless telecommunication network comprising a plurality of cells providing radio coverage through a plurality of frequencies, said system comprising:

means for setting a first admission control limit on a first frequency;

means for setting a second admission control limit on a second frequency;

means for checking the load on the first frequency; and means for diverting calls from the first frequency to the second frequency, whereby the admission control limit set on the second frequency is substantially less than the admission control limit set on the first frequency, wherein calls on the first frequency affected by coverage problems on the first frequency are diverted to the second frequency, and wherein the first and second frequencies are utilized within an individual cell.

8. A system according to claim 7 wherein said hand off is a hard handoff.

9. A system according to claim 7 wherein said means for setting admission controls is performed by an admission control algorithm.

* * * * *